United States Patent [19]

Shaw

[11] 4,028,893

[45] June 14, 1977

[54] OPEN CYCLE SOLAR ENERGY SYSTEM UTILIZING BUOYANCY AS A CONVERSION FORCE

[76] Inventor: John B. Shaw, 1812 E. Marlette, Phoenix, Ariz. 85016

[22] Filed: Apr. 3, 1975

[21] Appl. No.: 564,763

[52] U.S. Cl. .................................. 60/641; 60/496; 60/649; 415/5
[51] Int. Cl.² .......................................... F03G 7/02
[58] Field of Search ............ 60/495, 496, 650, 682, 60/641, 671, 651, 649; 415/5

[56] References Cited

UNITED STATES PATENTS

| | | | |
|---|---|---|---|
| 2,135,110 | 11/1938 | Platt | 60/496 |
| 3,715,885 | 2/1973 | Schur | 60/496 |

*Primary Examiner*—Allen M. Ostrager
*Attorney, Agent, or Firm*—Warren F. B. Lindsley

[57] ABSTRACT

An open cycle energy conversion system adaptable for use with, inter alia, solar collectors and other sources of available heat for increasing the temperature of a moving gas and employing a substantially vertically positioned gas expanding column comprising an endless arrangement of cups journaled for movement in a closed path in a liquid medium in the column for trapping the heated gas inside a succession of the cups inverted at the bottom of the column and displacing at least a part of the liquid in the cups, thereby providing a buoyancy force on the cups causing them to rise in the column exerting a rotating force on the endless arrangement of cups. The trapped gas is released at the top of the liquid in the column to be exhausted to atmosphere.

8 Claims, 9 Drawing Figures

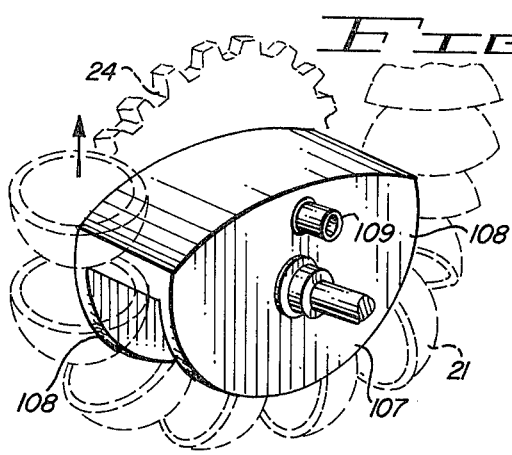
FIG-7
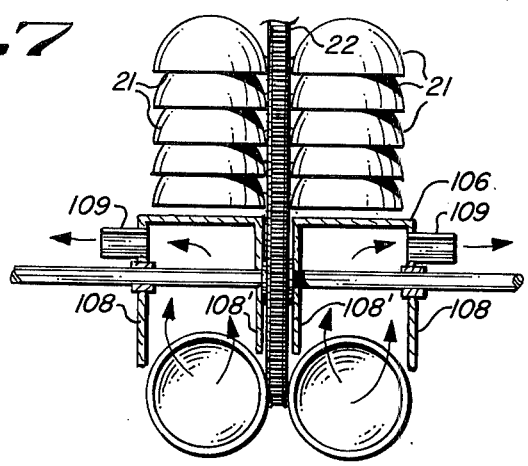
FIG-8
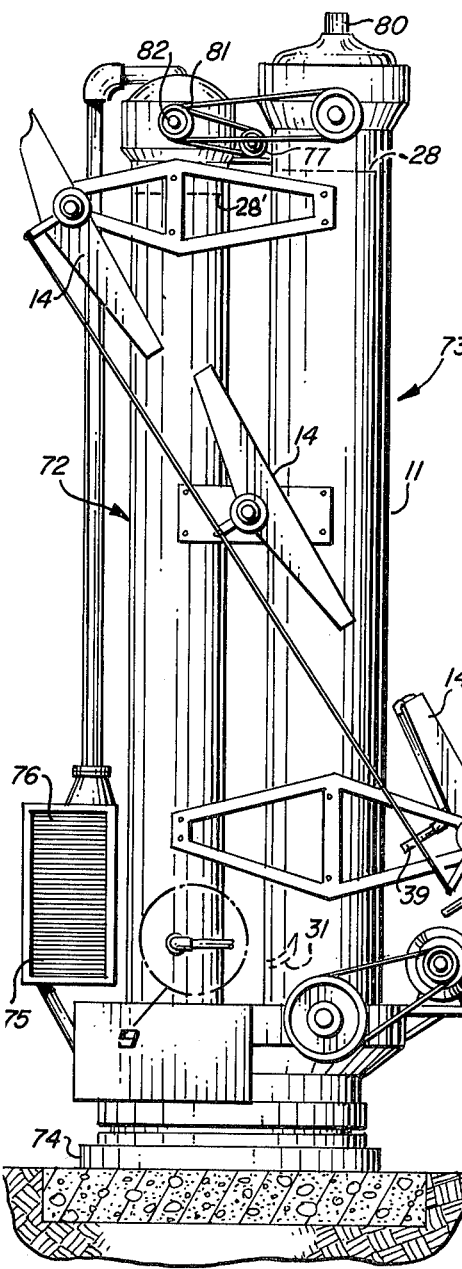
FIG-5
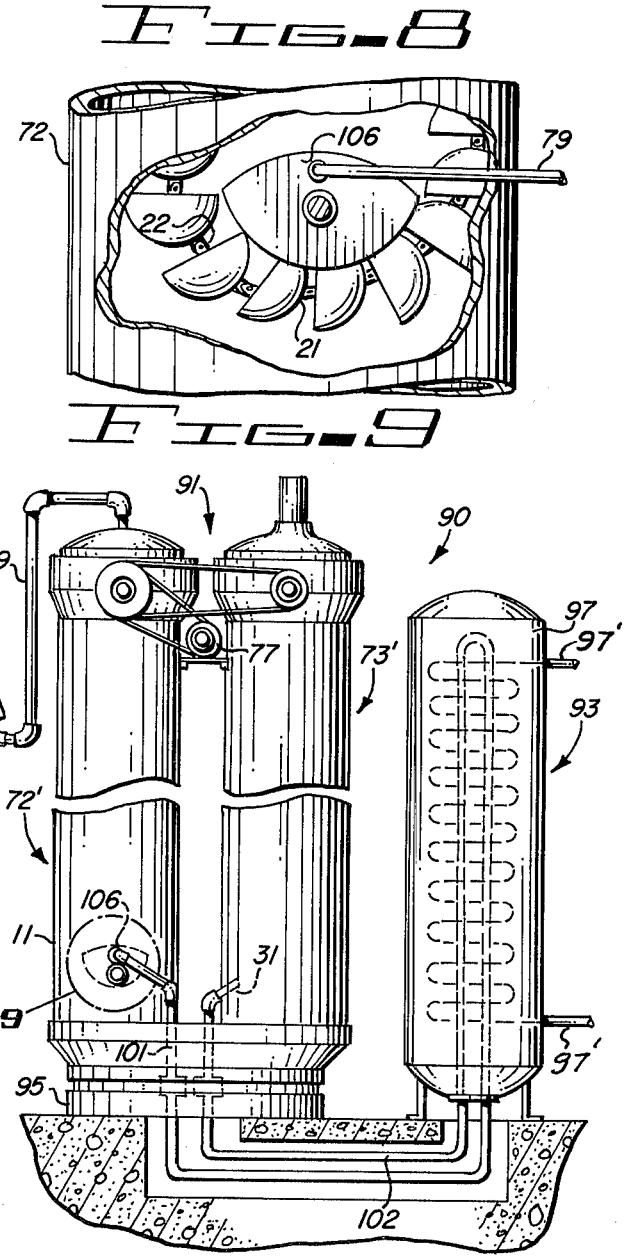
FIG-9
FIG-6

OPEN CYCLE SOLAR ENERGY SYSTEM UTILIZING BUOYANCY AS A CONVERSION FORCE

BACKGROUND OF THE INVENTION

In recent years, the rapid expansion of the world's population coupled with the accelerated technological development of large sectors of the world has produced a dramatic increase in the demand for energy in all forms including fuels and electricity for heating, lighting, transportion and manufacturing processes. The construction of hydroelectric facilities and the development of fossil fuel resources has continued at a rapid rate, but it becomes increasingly evident for a number of reasons that these efforts are inadequate to keep pace with the demands of the growing population.

A first difficulty is the limited availability of fuels such as oil and natural gas. Most countries in the world today do not have adequate sources of these fuels within their own boundaries and are dependent upon foreign sources, notably the middle East countries for supply. Such a dependence can and does have undesirable effects on the economies of the countries involved and political complications often result. There are also limited sites available that are appropriate for hydroelectric installations.

In the United States, there are a number of fossil fuels available, such as high-sulphur coal and oil shale, but the development and use of these resources has been complicated by economic and environmental concerns which rule against the use of these resources for a number of reasons including the destructive effects of strip mining, atmospheric contamination due to the high sulphur content of the coal, the cost of extracting the oil from the shale, etc.

More recently, the hope that nuclear power would soon lead to a rapid solution of the energy dilemma has been cooled by delays stemming again from environmental concerns and reservations about the safety of such plants and about the adequacy of plans for handling the radioactive wastes associated with such installations.

In the face of these growing demands and limited resources, there is one source of energy which is readily available to every country in the world in virtually unlimited quantities. This virtually untapped source is solar energy. *The World Book Encyclopedia* (copyright 1968, USA) states that the amount of solar energy reaching the earth in one day equals the energy that could be produced by burning 550,000,000,000 tons of coal — as much coal as would be dug in the United States in 1000 years at the 1968 rate of mining. It further states that enough solar energy reaches the United States in 20 minutes to fill the country's entire power needs for one year.

The interest in this almost boundless resource and in its development and harnessing for use in homes and factories is rising as other resources dwindle. Its desirability is further enhanced by the fact that solar energy may be converted to practical use without the hazard of environmental contamination.

In climates where there is an abundance of sunshine throughout the year, there is a growing interest in the harnessing of solar energy. Home owners and industrial operations are recognizing the potential value of having their own independent power sources which are not subject to interruption, other than natural phenomenons, curtailment or increased costs as the result of national or international events.

PRIOR ART

Until recently, the development of energy collectors and converters has been associated for the most part with solar programs involving military and space applications while only limited attention has been given to broad consumer use. As a result, there is a great potential for improvements in existing collection devices that will result in reduced manufacturing costs and improved thermal efficiencies.

One solar device for collecting thermal energy known as a flat plate collector is described by the *World Book Encyclopedia* (copyright 1968). It is made of metal and glass with one or more layers of glass laid over a blackened metal plate. Air spaces are provided between the layers of glass. Air or water passes through tubes under the metal plate to remove the collected thermal energy. The layers of glass in cooperation with the blackened metal plate act as a heat trap, letting in the sun's rays but keeping most of the heat from escaping again.

Other solar energy collectors have utilized parabolic reflectors which track the sun and focus the collected rays on an output or converter stage which delivers thermal, mechanical or electric energy.

Conversion from thermal to mechanical and electric energy has received a great deal of attention over the years and the technologies in these areas are well developed with the exception that the special requirements for relatively low power installations have generally been neglected. As a result, there are several proposed capital intensive systems available for conversion at very high power levels, but these systems are impractical in terms of initial and operating costs at low power, low temperature differential levels.

For the relatively low power applications towards which this invention is directed, a more simplified and inexpensive conversion means is needed.

SUMMARY OF THE INVENTION

In accordance with the invention claimed, an improved energy conversion system is provided which is particularly suited for applications at the relatively low power levels which are of interest to home owners, small businesses and industrial operations.

It is, therefore, one object of this invention to provide an improved low cost energy conversion system.

Another object of this invention is to provide an improved low cost solar energy collector and conversion system.

A further object of this invention is to provide such a system which is particularly well suited for application at the lower power levels where conventional thermal to mechanical and electrical conversion systems are not economically attractive.

A still further object of this invention is to provide such an improved system through the use of a novel conversion means untilizing the buoyancy of a gas in a liquid column as the motive force.

A still further object of this invention is to provide such an improved system wherein the compression of a gas is accomplished by an inversion of the means utilized to obtain the buoyancy force.

A still further object of this invention is to provide in such a system a capability for collecting at all times during the day a maximum amount of radiated energy from the sun, this being achieved through the incorporation of a tracking mechanism which causes the collectors to be optimally directed at all times.

A still further object of this invention is to provide such a system in a compact structure which may be conveniently installed in a wide choice of locations.

A still further object of this invention is to provide in such a system a capability for storage of thermal energy during periods of peak availability, the stored energy being available for utilization during periods of darkness or high demand.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing, in which:

FIG. 5 is a further modification of an open cycle system embodying the invention;

FIG. 6 is a diagrammatic representation of a more elaborate embodiment of the invention which incorporates in addition to the collector and converter of FIG. 1, an auxiliary collector and a thermal energy storage capability;

FIG. 7 is one of two of the gas collecting shrouds shown in FIG. 9; and

FIG. 8 shows two of the gas collecting shrouds shown in FIG. 7; and

FIG. 9 is a cut-away view at the base of columns 72 and 72' of FIGS. 5 and 6, respectively.

DESCRIPTION OF THE PREFERRED EMBODIMENT

Figure 1:
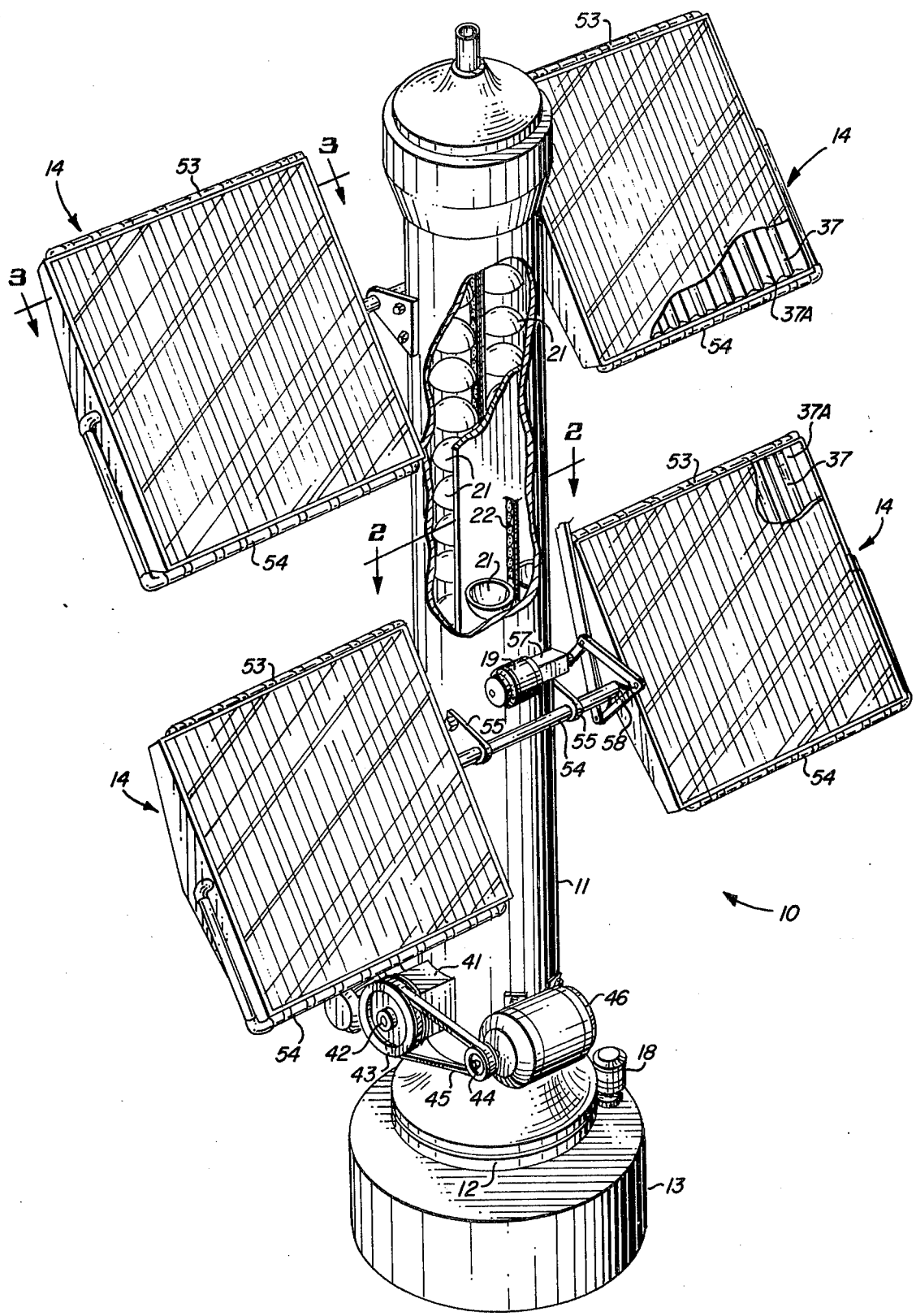
FIG. 1 is a perspective view of a first embodiment of a solar energy collector and conversion system.

Referring more particularly to the drawing by characters of reference, FIGS. 1–4 disclose an improved open cycle solar energy collector and conversion system 10 comprising a vertically positioned cylindrical insulated tank or column 11 resting on a rotatable support 12 which is mounted on a concrete footing 13. One or more tilting collector panels or collectors 14 are pivotally secured to the sides of column 11. A rotational drive motor 18 is provided for rotating column 11 on support 12 with a tilting drive motor 19 for tilting the collectors 14.

A plurality of cups 21 are secured to both sides of an endless drive chain 22. Chain 22 is carried on first and second coplanar sprocket wheels 23 and 24 having parallel axis 25 and 26, respectively. The first wheel 23 is mounted near the top of column 11 and the second wheel 24 is mounted near the bottom of column 11 so that when wheels 23 and 24 rotate in a clockwise direction, as viewed in FIG. 4, the plurality of cups 21 which are equally spaced along both sides of th full length of chain 22 are moved upward in an inverted position on the rising or left half portion of chain 22, are then tilted upright as they pass over the top of wheel 23, and move downward in an upright position as they are carried to the bottom of tank 11 where they again rotate to an inverted position as they pass around wheel 24. It should be noted that the cups may be spaced closer together as shown in FIG. 9 or farther apart along chain 22 and may be randomly spaced or spaced in separate groups, if so desired. A vertical plate 27 separates the right half of column 11 from the left half of column 11. A liquid 28 is provided in column 11 in which the wheels 23 (except for the top portion thereof), chain 22 and cups 21 are submerged, which liquid may be water or any other suitable liquid, such as oil or fused salts.

Figure 2:
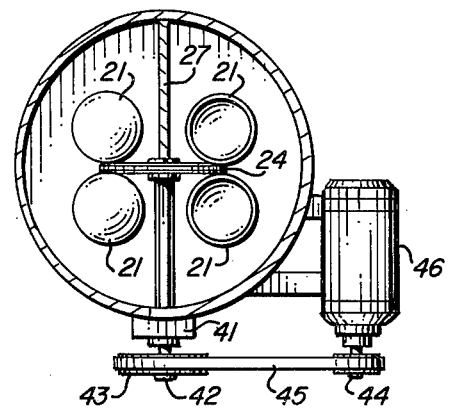
FIG. 2 is a partial cross-sectional view of the equipment of FIG. 1 taken along the line 2—2 with the collector portion omitted.

As shown in FIGS. 1 and 2, the endless drive chain 22 comprises pairs of cups 21 juxtapositioned along the chain and opening in the same direction to provide, when containing gas, a joint buoyancy effect on the chain.

Figure 4:
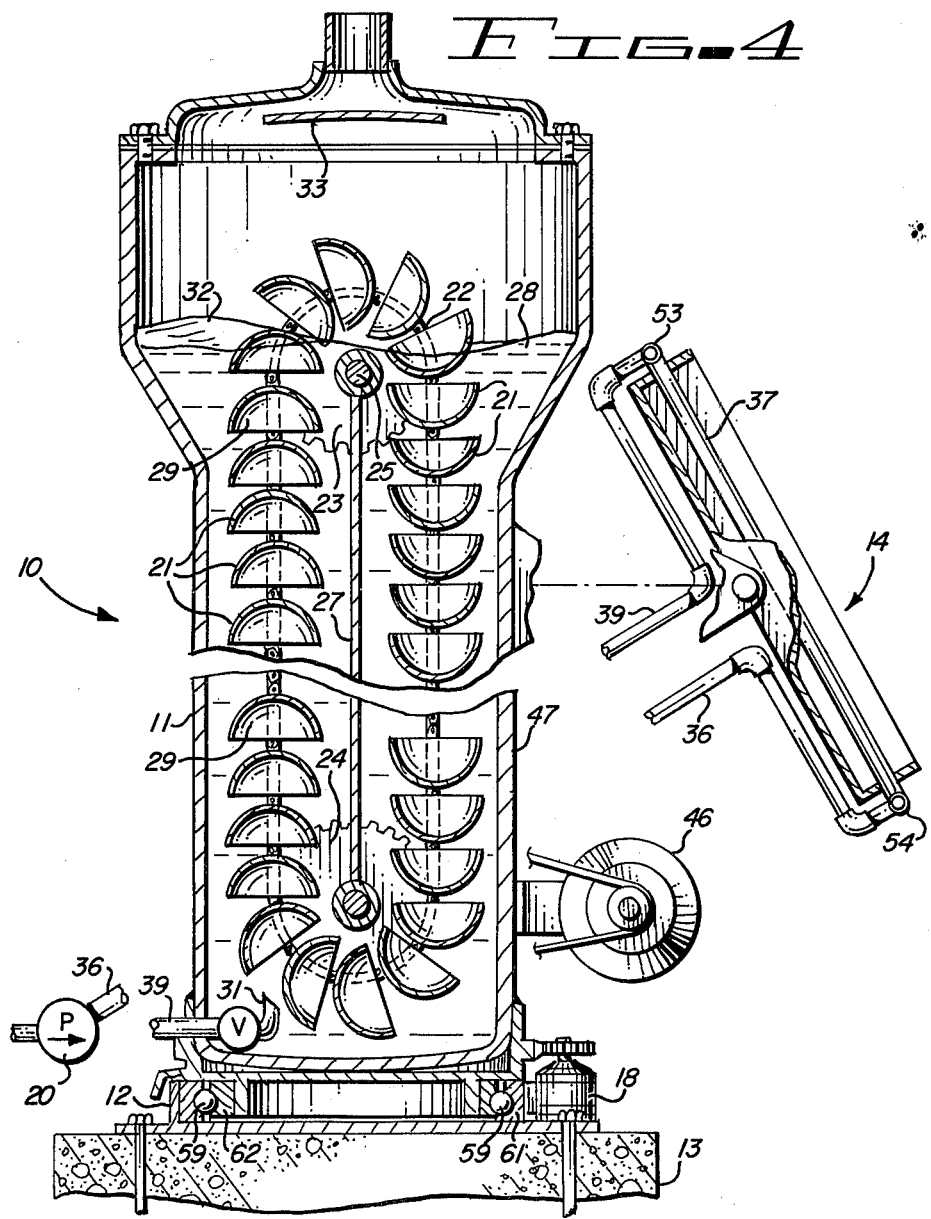
FIG. 4 is a partial cross-sectional side view of the collector and converter of FIG. 1 with only one of the four collectors in FIG. 1 shown.

Fluid 28, which for purposes of discussion is considered, but not limited to, water, is confined to the interior of column 11 where it serves as a medium for the buoyancy effect produced on the inverted cups 21 by a moving gas 29 which is injected into column 11 from a pair of nozzles 31 (only one of which is shown in FIG. 4) located just below a juxtapositioned pair of cups 21 near a point to the lower left of wheel 24 where the cups 21 are achieving their inverted position during their travel along the endless path.

Beginning at the point of discharge from nozzles 31, a quantity of the gas 29 is discharged into each passing cup 21 as it assumes the inverted position, the gas producing a buoyant upward force on cups 21 and driving then upwardly until they reach the top surface 32 of fluid 28. Then, as the cups rotate to an upright position, the gas is spilled into the open space above the surface 32 of fluid 28 where it flows around a baffle plate 33 and upward through a pipe 34 to atmosphere.

In the simple open cycle system shown in FIGS. 1–4, with solar collectors 14 omitted, pipe 39 receives air or steam from a source of heat, such as, for example, waste steam from an industrial process or geothermal steam which is transmitted directly to nozzles 31.

As shown in FIGS. 1–4, air from the atmosphere may be drawn into pump 20 and discharged under pressure into a tube 36 which carries it to collectors 14 where it flows through collector tubes 37 picking up thermal energy collected from the sun, the added thermal energy when the gas is released causes it to flow at a greatly increased rate through an exhaust tube 39 which leads directly to nozzle 31; although pump 20 is shown for purposes of illustration, it may be omitted if the gas is under pressure.

Ideally, the liquid 28 inside column 11 is held at a temperature approximating that of the gas 29 as it is ejected from nozzles 31 into cups 21 partially filling them. The quantum load of gas 29 inside cups 21 then expands as it is subjected to the lessening hydrostatic pressure as it rises and absorbs additional thermal energy from the surrounding cups 21 and fluid 28. As the captured gas within cups 21 drives them upward, the thermal energy of the gas manifesting as buoyancy is converted to mechanical energy. Expansion of gas 29 within the inverted cups 21 as heat is gained from the surrounding medium produces an added increment of buoyancy accounting for additional conversion of thermal to mechanical energy.

The buoyancy force thus applied to the inverted cups 21 is converted into torque acting on axis 26 of wheel 24. The axis 26 is coupled directly to a gear box 41 which is mounted on the outside wall of column 11. The gear box 41 accomplishes a step-up in rotational velocity at its output shaft 42 on which is mounted a drive pulley 43 which in turn, is coupled to a second pulley 44 by means of a drive belt 45. The second pulley 44 is mounted on the shaft of an electric generator 46 which converts the mechanical energy to electrical energy for transmission to the point of use.

The column 11 has an outer insulation barrier 47 which prevents excessive heat loss through its walls and facilitates the maintenance of the elevated temperature of the liquid 28.

Figure 3:
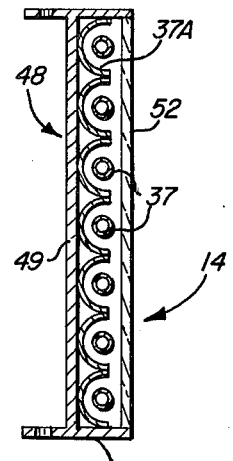
FIG. 3 is a cross-sectional view of one of the collector assemblies of FIG. 1.

Each of the collectors 14 have a plurality of parallel collector tubes 37 which run in a generally vertical direction, each lying along the focal line of a linear parabolic reflector channel 37A, shown in FIGS. 3, the surface of the channel being coated with a reflective material. The reflector channels 37A are supported and insulated inside a collector frame 48 having a flat back-up plate 49 and surrounding perpendicular walls 51. The collector tubes 37 are coated with a black material for maximum thermal absorption. Covering the front of the collectors 14 is an insulating glass face 52 which comprises two parallel sheets of glass separated by a depleted air space, the insulating glass sandwich commonly known in the building trade as Thermopane. The glass face 52 readily passes the incident thermal energy radiated from the sun but substantially reduces heat loss from the tubes 37 by convection. The upper ends of the tubes 37 are interconnected by an upper junction tube 53 and the lower ends of the tubes 37 are interconnected by a lower junction tube 54. Tube 36 from pump 20 connects through an articulated joint to lower junction tube 54 delivering pressurized gas to collector 14 which flows upward through the plurality of parallel collector tubes 37 into upper junction tube 53 through a return articulated joint and thence into tube 39 which connects throttling valve 39 and expansion tube 40 to jet nozzles 31 for discharge into cups 21. Where more than one of the collectors 14 are employed, as indicated in FIG. 1, the upper junction tubes 53 are all connected together and the lower junction tubes 54 are all connected together so that all of the collectors 14 are effectively connected in parallel for parallel fluid or gas flow.

The collector panels 14 are supported by means of brackets 55 and pivot bars 56. As shown more clearly in FIG. 1, one bar 56 and two brackets 55 are utilized to support two collector panels 14, the bar 56 constituting a round horizontal bar which is fixedly attached to the two adjacent collectors 14 and passes through aligned holes in the two brackets 55, the brackets 55 being attached side-by-side to the outside wall of column 11. The tilt drive motor 19 which is also secured to the wall of column 11 has its shaft coupled through a gear box 57 and a lever type linkage 58 to one of the collectors 14 and is controlled to direct the gang coupled collectors 14 toward the sun.

It will be recognized that the tilting of the collectors 14 can accomplish only the appropriate elevation adjustments. The collectors must also be turned to the proper azimuth orientation. This is accomplished by means of the rotatable support 12 and the rotational drive motor 18. Rotatable support 12 incorporates a set of heavy duty ball bearings 59 confined within mating concentric raceways 61 and 62, raceway 61 being fixedly attached to footing 13 and raceway 62 being fixedly attached to the base of column 11. Column 11 is thus free to rotate relative to footing 13 as it is supported by the rolling bearings 59. The combined double planes of rotation permits the maximum incidence of solar heat to be focused on the tubes 37.

The relatively simple open cycle solar collector and converter system of FIGS. 1–4 is thus seen to provide the desired functions of collecting radiated thermal energy from the sun or from any other heat source converting it first to mechanical energy and then to electrical energy for transmission to the point of use. The total system is compact unitized and inexpensive and does not require carefully machined parts or parts subjected to excessively high temperatures or to high fluid velocities. Low initial cost, low maintenance and long equipment life are thus to be expected.

It should be noted from FIG. 5 that a simple means of producing power by using atmospheric air as a working medium or fluid in an open cycle system may be implemented by merely using the combined compressor, collector and converter unit 70 as a power generating means. As shown in FIG. 5, the power generating means comprises collectors 14, a compressor 72 and an expander tower 73, all mounted on a common rotatable support 74 which is similar to rotatable support 12 shown in FIGS. 1 and 4.

Atmospheric air is drawn through an air inlet 75 which may be in the form of an evaporative cooler 76 or other means and is then directed to compressor 72 where it is captured in the decending cups 21 and isothermally compressed within a cooled liquid 28' of compressor 72.

The compressor 72 is similar in construction to the converter of FIGS. 1–4 incorporating an identical vertical column 11, sprocket wheels 23 and 24, chain 22, attached cups 21, a fluid medium 28', etc. In the case of the compressor, however, the inverted cups 21 are mechanically driven downward by an externally applied torque applied to upper sprocket wheel 23, the torque being supplied by the expander tower 73 which is identical with column 11 of FIGS. 1–4. Motor 77 is provided in this combination for start-up only. As the cups 21 revolve to the inverted position above the fluid 28' within compressor 72, they trap quantities of cooled air supplied by air inlet 75 carrying the trapped air downward toward the bottom of compressor 72, the pressure increasing in direct proportion to the hydrostatic depth pressure of the fluid 28'. The temperature increase due to compression is dissipated into the fluid 28' which is continuously cooled by means well known in the art. Finally, as the cups pass around the lower sprocket wheel 24 and are thereby rotated to an upright position, the compressed gas is spilled from the cups and is captured by a shroud 106 from which it is led by a tube 79 out the bottom of compressor 72 through tubes, joints, etc. to the solar panels 14 to acquire additional heat energy then led to the throttling valve 40 for release into the cups 21 of the air expander tower 73 in the same manner as described for the structure shown in FIGS. 1–4.

Expander tower 73 is also very similar in construction to the converter of FIGS. 1–4 having inside a column 11, the sprocket wheels 23 and 24, chain 22, attached cups 21, fluid 28, nozzles 31, etc. The pressurized hot air from tube 39 is introduced at nozzle 31. It is captured by the inverted cups 21 and its thermal and compressive energy is utilized to drive the cups upward until the now cooled air is spilled above the surface of the fluid 28 and is released to the atmosphere through exhaust port 80. In this case, the net mechanical energy developed is delivered through the axle 26 of the lower sprocket wheel 24. The external sprocket 81 which is attached directly to the axle 82 of the compressor is also coupled to and is driven by the shaft of sprocket 23 of expander 73.

Because sunlight is not available 24 hours of the day, it is desirable to provide a means for storing energy during the daylight hours for use during hours of darkness. The more elaborate system of FIG. 6 incorporates the additional energy storage capability.

FIG. 6 discloses a solar energy collection, conversion and storage system 90 comprising a solar energy collector and converter unit 91 which is essentially identical to the collector and converter 70 of FIG. 5, with the addition of a storage unit 93.

Unit 91 comprises a collector 94, a compressor 72' and an expander 73', all mounted on a common rotatable support 95 which is similar to rotatable support 12 of FIGS. 1 and 4. Atmospheric air is drawn into the first collector 94 and is heated by solar energy. It is then transferred to compressor 72' which intensifies its temperature by hydrodynamic compression in hot liquid. From compressor 72', it is passed through storage unit 93 where a major part of its thermal energy is transferred to the contained fluid 97 for storage. The pressurized, but lower temperature air, is then passed onto expander 73' where its residual pressure is converted to mechanical energy to be utilized in augmenting the drive motor 77 driving compressor 72'. It should be noted that coil 97' of storage unit 93 may be used as a passageway for fluid flow to withdraw heat from the contained fluid 97. The heat of the fluid flowing through coil 97' may be used to augment the heat energy at the base of column 11 of FIG. 1.

The collector 94 is similar in construction to the collectors 14 of FIGS. 1–4. In this case, however, an intake port 98 is provided for the ingestion of atmospheric air. The heated air from collector 94 is drawn to the top of compressor 72' by a flexible connecting tube 99.

The compressor 72' is similar in construction to the converter shown in FIGS. 1–4 and FIG. 5 incorporating substantially identical vertical column 11, sprocket wheels 23 and 24, chain 25, attached cups 21, a fluid medium 28', etc. As in FIG. 5, the compressor employs inverted cups 21 mechanically driven downwardly by an externally applied torque being supplied by the motor 77 to the upper sprocket wheel 23, the torque being continuously supplied by motor 77 and augmented by recovery unit 73' which is substantially identical with column 11 of FIGS. 1–4. As cups 21 revolve to the inverted position above fluid 28' within compressor 72', they trap heated air supplied by collector 94 carrying the trapped air downward toward the bottom of compressor 72', the pressure and temperature increasing in direct proportion to the rising hydrodynamic pressure of fluid 28'. Finally, as the cups pass around the lower sprocket wheel 24 and are thereby rotated to an upright position, the compressed gas is spilled from the cups and is captured by a shroud 106 which collects and leads the pressurized hot air through conduit 101 into and through the storage unit 93 where it transfers most of its heat by conduction to the fluid content of storage unit 93 and back through conduit 102 to the nozzle 31 of the expansion recovery tower 73'. Tower 73' operates in the same manner as described for expander tower 73 of FIG. 5.

FIGS. 7 and 8 illustrate shrouds which may be used in the compressors 72 and 72' of FIGS. 5 and 6.

Each of these shrouds comprise an arcuate configuration 107 formed by flanges 108, 108' spaced apart to define a pathway for cups 21 which capture the compressed gas therebetween and directs the captured gas out of the shrouds through pipes 109.

FIG. 8 illustrates a combination of two shrouds arranged in a side by side arrangement for handling an arrangement of juxtapositioned cups 21 on chain 22, as shown.

Although but a few embodiments of the present invention have been illustrated and described, it will be apparent to those skilled in the art that various changes and modifications may be made therein without departing from the spirit of the invention or from the scope of the appended claims.

What is claimed is:

1. A method of generating mechanical movement from the buoyancy effect of a gas comprising the steps of:
   compressing a relatively low temperature gas in a sequence of containers as they move from substantially the top to substantially the bottom of a conveyor through a substantially vertically positioned first liquid containing column means,
   removing most of the heat energy of compression from the gas as it is being compressed in its movement from the top to the bottom of the first liquid,
   extracting the compressed gas from the first liquid containing column means,
   adding heat energy to said gas, and
   injecting the compressed and heated gas into a second liquid containing column adjacent its base and into a sequence of interconnected gas retaining containers mounted on an endless conveyor positioned in said second column longitudinally of its length and moving from the bottom to the top of said second liquid containing column,
   said gas buoyantly expanding in the containers casuing said containers and said endless conveyor to move around a fixed path thereby generating useful mechanical movement, and
   releasing the expanded gas from said containers at a substantially topmost point along the fixed path of movement of the conveyor to atmosphere.

2. The method of generating mechanical movement set forth in claim 1 wherein:
   the heat energy added to the gas comprises heat absorbed by conduction from the containers and the liquid in the second column and said second liquid containing column is externally reheated by an outside source.

3. A unitary mechanism utilizing the buoyancy effect of a gas in an immiscible liquid for generating mechanical movement comprising:
   a substantially vertically positioned rotatable liquid containing column means mounted on a base and having a bottom and a top,
   a liquid provided for said column means,
   an endless conveyor mounted in said column means longitudinally thereof and having a plurality of similarly arranged cups spacedly positioned along said conveyor for rotation around a fixed path, a solar collector comprising an array of fluid conducting tubes arranged adjacent a concentrating reflecting surface mounted on said column, a fluid under pressure, said fluid being immiscible with said liquid, a first means for conducting said pressurized fluid through the tubes of said collector to super heat it in a gaseous state, a second means connected to said first means for injecting the gas sequentially into each of said cups at substantially the bottom of said column when said cups are achieving an inverted position, said heated gas expanding in each of said cups to rotate said conveyor in a direction toward the top of the liquid in said column means around its fixed endless path.

4. The mechanism set forth in claim 3 in further combination with:

a substantially vertically positioned liquid containing second column means mounted on said base and having a bottom and a top, a second liquid provided in said second column means, a second endless conveyor mounted in said second column means longitudinally thereof and having a plurality of similarly arranged cups spacedly positioned along said second conveyor for rotation around a fixed path, a second fluid, said second fluid being non-mixable with said second liquid, means for injecting said second fluid sequentially into each of said cups at substantially the top of said second column means when the cups are achieving an inverted position, said second fluid being compressed within the liquid of said second column means as the cups rotate in said second conveyor from the top to the bottom of the second liquid in said second conveyor, and third means for extracting the compressed second fluid under pressure from the bottom of said second conveyor and injecting it into said first means.

5. The mechanism set forth in claim 4 wherein:

said second liquid in said second column means comprises relatively cool water.

6. The mechanism set forth in claim 3 in further combination with:

third means for connecting to the top of said conveyor for transmitting the heated expanded gas discharged from the cups of the conveyor through a coil mounted in a water storage tank to atmosphere, said coil forming a heating means for the water in the storage tank.

7. A method of generating mechanical movement from the buoyancy effect of a gas comprising the steps of:

compressing a relatively low temperature gas in a sequence of containers as they move from substantially the top to substantially the bottom of a conveyor through a substantially vertically positioned first liquid containing column means, extracting the compressed gas from the first liquid containing column means, injecting the compressed gas into a second liquid containing column adjacent its base and into a sequence of interconnected gas retaining containers mounted on an endless conveyor positioned in said second column longitudinally of its length and moving from the bottom to the top of said second liquid containing column, said gas buoyantly expanding in the containers causing said containers and said endless conveyor to move around a fixed path thereby generating useful mechanical movement, and releasing the expanded gas from said containers at a substantially topmost point along the fixed path of movement of the conveyor to atmosphere.

8. The method set forth in claim 7 in further combination with the method step of:

adding heat energy to said compressed gas before injecting it into said second column.

* * * * *